United States Patent [19]

Chung

[11] 4,447,956
[45] May 15, 1984

[54] CENTERING DEVICE

[76] Inventor: Hun H. Chung, No. 98-13, Tung Yang Rd., Fon Yuan City, Taiwan

[21] Appl. No.: 411,874

[22] Filed: Aug. 26, 1982

[51] Int. Cl.³ ............................................. G01B 5/25
[52] U.S. Cl. .............................. 33/172 D; 33/169 C; 33/185 R; 33/DIG. 15; 340/678; 340/680
[58] Field of Search ............ 33/185 R, 169 C, 172 D, 33/DIG. 15, 169 R; 340/678, 686, 679, 680

[56] References Cited

U.S. PATENT DOCUMENTS

| | | |
|---|---|---|
| 1,414,483 | 5/1922 | Novitzky . |
| 2,109,976 | 3/1938 | Pierce ................................ 33/185 R |
| 2,286,088 | 6/1942 | Harrell . |
| 2,361,462 | 10/1944 | Dickinson .......................... 340/678 |
| 2,484,801 | 10/1942 | Anderson . |
| 2,490,483 | 12/1949 | Simer ................................ 33/169 C |
| 2,506,236 | 5/1950 | Overwyer, Jr. . |
| 2,572,999 | 10/1951 | Elliott . |
| 2,674,807 | 4/1954 | Russa . |
| 2,734,277 | 2/1956 | Dixon et al. . |
| 3,075,294 | 1/1963 | Strecker . |
| 3,120,062 | 2/1964 | Butala . |
| 3,470,618 | 10/1969 | Richer ............................... 33/169 C |
| 3,785,057 | 1/1974 | Streander . |
| 3,826,011 | 7/1974 | D'Aniello . |
| 3,903,609 | 9/1975 | Brown ............................... 33/185 R |

FOREIGN PATENT DOCUMENTS 557267 11/1943 United Kingdom .

Primary Examiner—William D. Martin, Jr.
Attorney, Agent, or Firm—Tak Ki Sung

[57] ABSTRACT

A centering device for locating and aligning the center of a workpiece with the center axis of the spindle of a manufacturing machine such as a drill press and the like, comprising a centering pointer and a centering block; the centering pointer having a needle slidably disposed therein and an indicator lamp and being adapted to be detachably mounted to the spindle of the manufacturing machine, the centering block having a cylindrical surface and an L-shaped cut away to be mounted onto an edge of the workpiece, the L-shaped cut away having one surface passing through the center axis of the centering block. The needle has a lower point adapted to be coasted along a convex path of the cylindrical surface of the centering block, and an upper end adapted to come into contact with a probe member, which is frictionally held within the centering pointer so as to act as an electrical contact for causing the indicator lamp to light, when the needle comes to a peak point of the convex path indicating that the center axis of the spindle is aligned with the center axis of the centering block.

1 Claim, 7 Drawing Figures

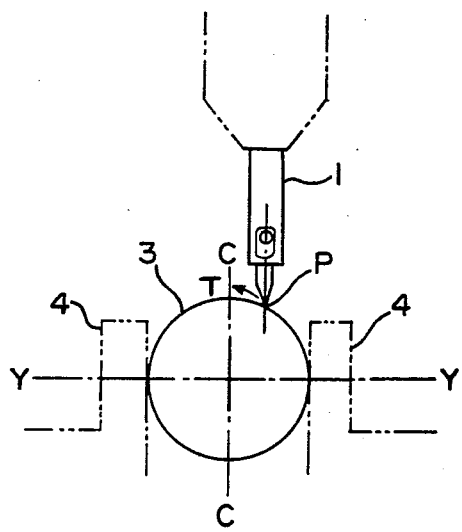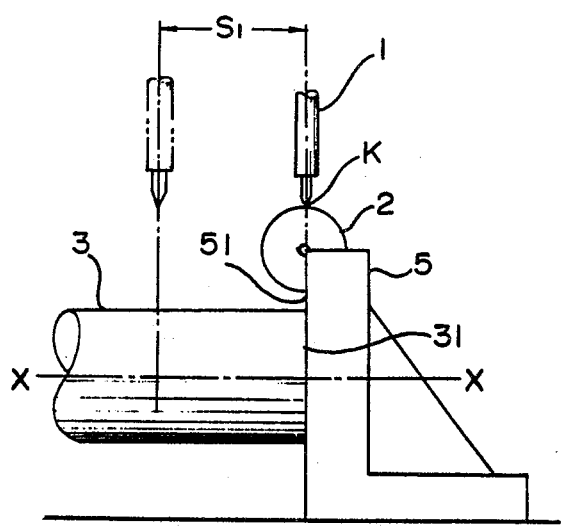
FIG. 4  FIG. 5
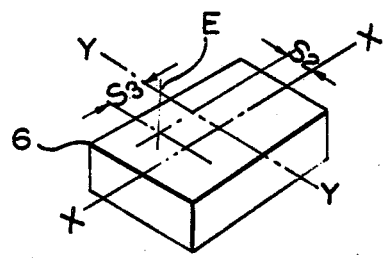
FIG. 6
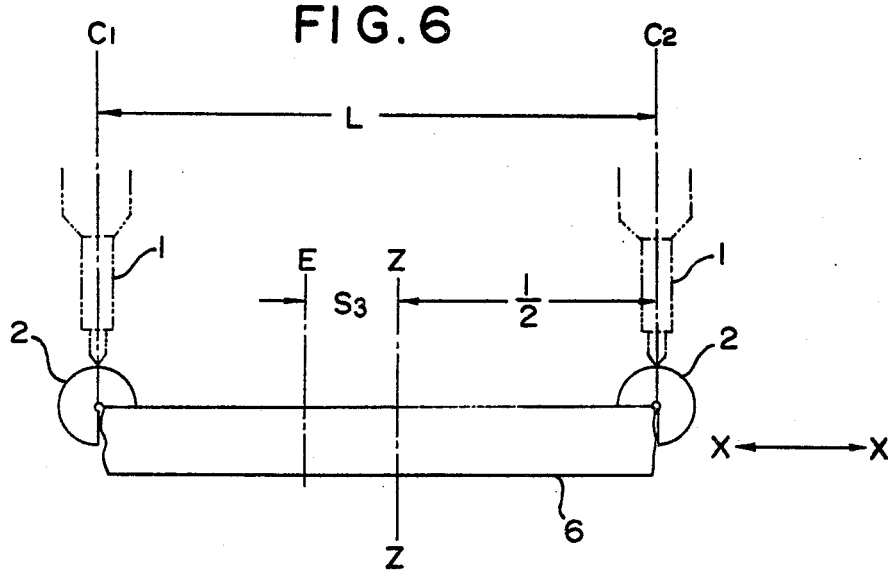
FIG. 7

CENTERING DEVICE

BACKGROUND OF THE INVENTION

This invention relates to a centering device for locating the center of a workpiece and for aligning the center of a workpiece with the center axis of the spindle of a manufacturing machine such as a drill press and the like.

DESCRIPTION OF PRIOR ART

A commonly accepted practice in most machine shops for locating the center of a workpiece is marking the workpiece with reference lines according to the blue print, on a surface plate by means of a number of marking instruments including a surface gage, height gage, a scriber, etc. As soon as the workpiece is marked with reference lines, the center point is further marked with a center punch, and then the workpiece is mounted onto the worktable with suitable clamping means such as a vise for drilling or cutting.

In U.S. Pat. No. 4,319,400 issued on Mar. 16, 1982 to the present inventor a centering device to be used in conjunction with a conventional dial indicator for locating the center of a workpiece without the need of the above-described marking process is disclosed. The centering device comprises a centering pointer and a centering block; the centering pointer having a needle resiliently and slidably held in a hollow holder to be mounted onto the spindle of a manufacturing machine such as drill press, the needle having a lever for transmitting the needle's movement to a dial indicator; the centering block being formed of a cylindrical block with an L-shaped cutaway to be mounted onto an edge of the workpiece. The center of the workpiece is located by this centering device, with the assistance of the dial indicator, by moving the centering pointer along the convex, arcuate surface of the centering block to align the centering pointer with the peak of the convex, arcuate surface.

The centering device according to this patent is convenient and accurate. However, the need of a dial indicator remains to be a disadvantage since the dial indicator must be properly mounted onto a stationary part of the machine.

SUMMARY OF THE INVENTION

The present invention offers an improved centering device comprising a centering pointer and a centering block, wherein the centering pointer is provided with an indicator lamp so as to eliminate the need of the dial indicator.

The centering pointer of the centering device of this invention comprises a metallic needle resiliently and slidably held in a hollow, cylindrical metallic holder to be mounted onto the spindle of a manufacturing machine such as a drill press, the needle having an outer end for contact with the convex, arcuate surface of the centering block and an inner end for contact with a probe frictionally and slidably held in and electrically insulated from the hollow cylindrical holder. The centering pointer is further provided with an indicator lamp to be lit by a battery when the inner end of the needle comes into contact with the probe.

The centering block of the centering device of this invention is formed of a cylindrical piece with an L-shaped cutaway at a 90° angle along the center axis, the L-shaped cutaway having at least one surface thereof passing through the center axis of the cylindrical piece so as to be mounted onto an edge of the workpiece with that surface passing through the center axis of the cylindrical piece to coincide with the edge of the workpiece.

The centering pointer is to be mounted onto the spindle of a manufacturing machine with the center axis of the centering pointer coinciding with the center axis of the spindle so that the center position of the workpiece is aligned with the center axis of the spindle when the center axis of the centering pointer is aligned with the center position of the workpiece. The alignment of the center axis of the centering pointer with the center position of the workpiece is attained by coasting the outer end of the needle of the centering pointer, which is mounted onto the spindle of the manufacturing machine, along the convex, arcuate surface of the centering block, which is mounted onto an edge of the workpiece, by moving the workpiece or the work table on which the workpiece is mounted, until the peak of the convex, arcuate surface of the centering block is located by the centering pointer and the indicator lamp is lit.

BRIEF DESCRIPTION OF THE DRAWINGS

FIGS. 4–5 are schematic drawings showing an example of the application of the centering device of this invention.

FIG. 6 is an oblique, perspective view of a workpiece to be drilled in a second example of the application of the centering device of this invention.

FIG. 7 is a schematic drawing showing the second example of the application of the centering device of this invention.

DETAILED DESCRIPTION OF THE INVENTION

Figure 1:
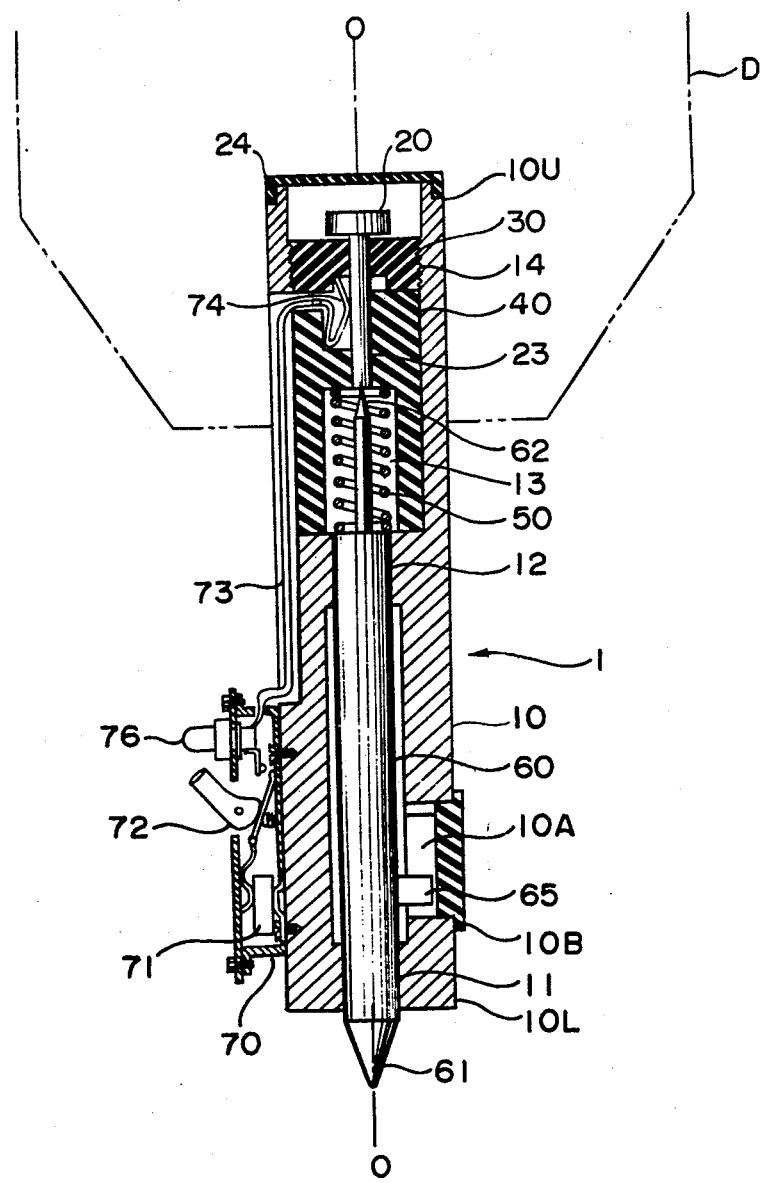
FIG. 1 is a longitudinal cross sectional view of the centering pointer of the centering device of this invention.
Figure 2:
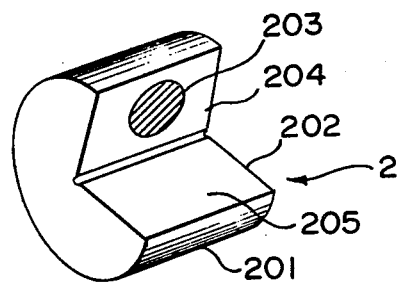
FIG. 2 is an oblique, perspective view of the centering block of the centering device of this invention.
Figure 3:
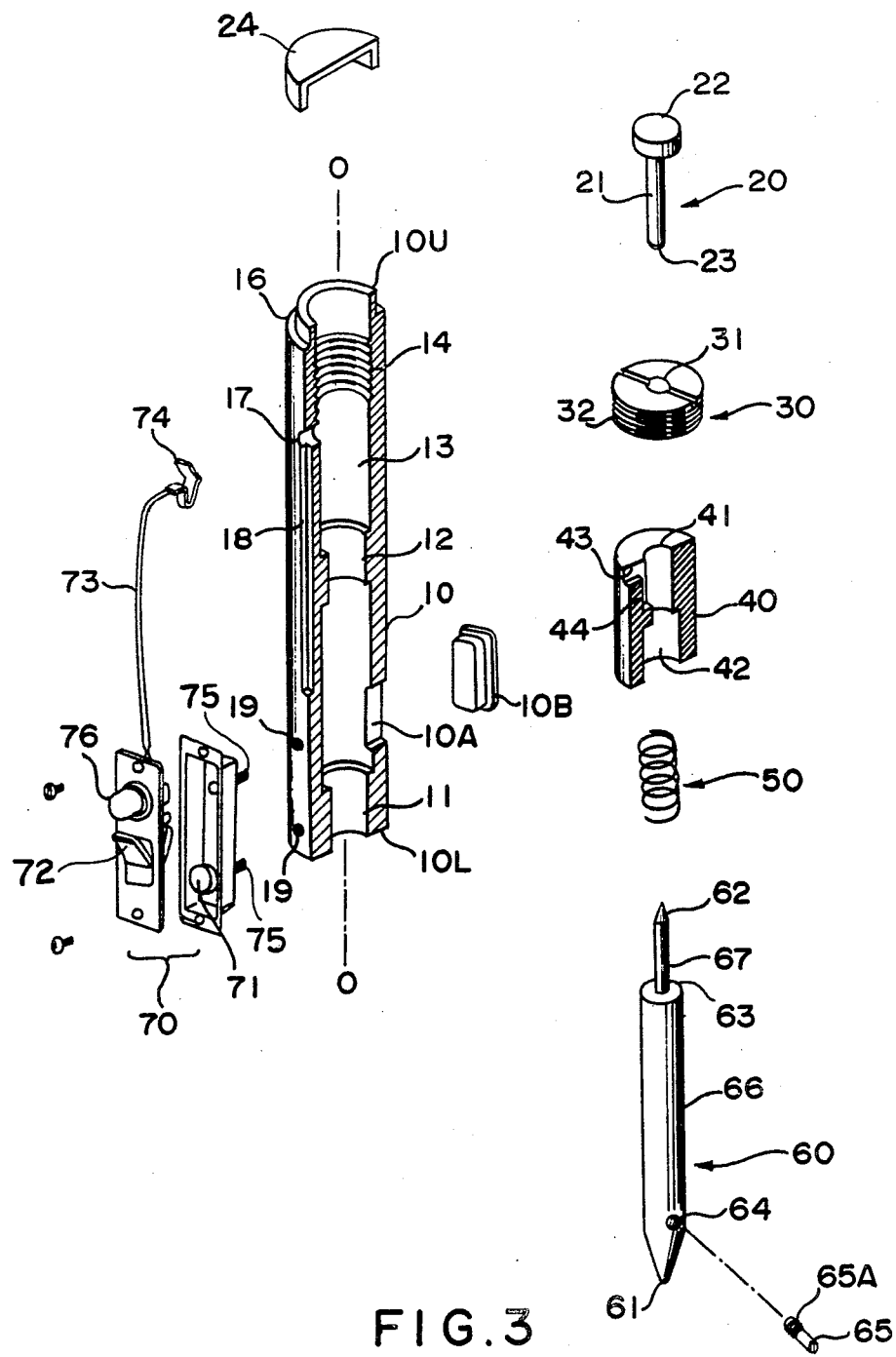
FIG. 3 is an exploded, oblique, perspective view of the centering pointer of FIG. 1, partly in section.

The centering device of this invention comprises a centering pointer 1 as shown in FIGS. 1 and 3, and a centering block 2 as shown in FIG. 2.

As shown in FIG. 1 centering pointer 1 comprises a hollow, cylindrical metallic holder 10 (hereafter as holder) having a longitudinal center axis 0-0, upper end 10U and lower end 10L; a metallic needle 60 (hereinafter as needle) slidably and coaxially inserted in holder 10, needle 60 having upper end 62 and lower end 61, and stopper 65 extending into a slot 10A provided in the wall of holder 10 so as to allow a limited longitudinal movement of needle 60; an insulation sleeve 40 fixedly inserted in holder 10; a coil spring 50 adapted to urge needle 60 toward lower end 10L; a nut 30 in screw-thread engagement with an upper, inner part of holder 10 so as to firmly secure insulating sleeve 40 in place; a metallic probe member 20 (hereafter as probe member) slidably inserted into nut 30 and insulation sleeve 40, probe member 20 having a lower end 23 corresponding with upper end 62 of needle 60; a resilient contact member 74 adapted to urge probe member 20 traversely against insulation sleeve 40 so as to frictionally retain probe member 20; a switch assembly 70 having electric cord 73 connecting switch assembly 70 with resilient contact member 74.

Referring to FIG. 3, holder 10 is provided with lower bearing portion 11 and central bearing portion 12 for slidably receiving needle 60, inner compartment 13 for fixedly accomodating insulation sleeve 40, screw-threaded section 14 for receiving nut 30, upper compartment 15, upper outer peripheral recess 16 for receiving insulation cap 23, elongated slot 10A for receiving stopper 65 of needle 60, hole 17 through which electric cord 73 passes, elongated groove 18 for embedding electric cord 73, and screw-threaded holes 19 for mounting switch assembly 70.

Needle 60, as shown in FIG. 3 is provided with lower end 61 having a finely polished point and a screw-threaded hole 64 at a suitable distance from the lower end, upper end 62 which is also pointed and formed on an extension 67 having a diameter smaller than that of body 66 of needle 60 so that a shoulder 63 is formed to receive one end of coil spring 50. Needle 60 is further provided with a stopper 65 having a screw threaded end 65A to be screwed into screw threaded hole 64, stopper 65 being so mounted by passing stopper 65 through elongated slot 10A inwardly to engage with screw threaded hole 64 while needle 60 is inserted in holder 10.

Insulation sleeve 40, which is made of a suitable insulation material such as plastic, is provided with central bore 41 and lower compartment 42 in which coil spring 50 is accomodated, a radial slot 43 formed in the upper end, and an inner compartment 44 communicating with radial slot 43. Insulating sleeve 40 is inserted into compartment 13 of holder 10 with radial slot 43 communicating with hole 17 of holder 10.

Nut 30 which is made of a suitable insulation material such as plastic, is provided with screw threads 32 to be engaged with screw-threaded portion 14 so as to fixedly retain insulation sleeve 40 in compartment 13 of holder 10, and central hole 31 to correspond with central bore 41 of insulation sleeve 40.

Probe member 20 which may be made of metal such as brass, is provided with a stem 21 to be slidably inserted into central hole 31 of nut 30 and central bore 41 of insulation sleeve 40, and head 22; stem 21 having lower end 23 adapted to come into contact with upper end 62 of needle 60 when either probe member 20 is moved downwards or needle 60 is moved upwards.

Resilient contact member 74, which may be made of metal such as spring brass, it disposed in inner compartment 44 of insulation sleeve 40 and is resiliently in contact with stem 21 of probe member 20 so as to urge stem 21 of probe member 20 against the wall of central bore 41 of insulation sleeve 40, thus holding probe member 20 frictionally in insulation sleeve 40.

Switch assembly 70 is detachably mounted onto holder 10 with cap screws 75 to engage with screw threaded holes 19 provided in holder 10. Electric cord 73, which connects switch 72 with resilient contact member 74, is embedded in groove 18. As shown in FIG. 1, switch assembly 70 is provided with a dry battery 71 having one pole connected to holder 10 and the other pole connected to one contact terminal of switch 72, switch 72 having another contact terminal connected to one terminal of lamp 76 which has another terminal connected to resilient contact member 74 by way of electric cord 73. When switch 72 is turned on, the two contact terminals of switch 72 are closed and a voltage is applied across probe member 20 and needle 60. As soon as either probe member 20 or needle 60 is moved to cause lower end 23 of probe member 20 and upper end 62 of needle 60 to come into contact with each other, electricity is supplied to lamp 76 and lamp 76 is lit accordingly.

Holder 10 is further provided with an elastic cap 24 to fit peripheral recess 16, and a side cover 10B to cover elongated slot 10A.

Referring to FIG. 2, centering block 2 is made of a cylindrical piece 201 with a finely finished cylindrical surface thereon, and is formed with an L-shaped cut-away 202 composed of two flat surfaces 204 and 205 cut longitudinally along the axis thereof, the surface 204 passing through and beyond the center axis and meeting surface 205 at an angle of 90 degrees, surface 204 having a magnet piece 203 embedded therein with its outer surface flush with surface 204.

It is to be understood that the primary purpose of the centering device of this invention is to locate and align the center position of a hole and the like to be drilled or cut in a workpiece with the center axis of the spindle of a manufacturing machine such as a drill press.

The principle and application of the centering device of this invention will now be described with reference to the examples illustrated in FIGS. 4 to 6.

Referring to FIGS. 4 and 5, a cylindrical workpiece 3, as an example, is to be prepared for drilling there through a hole having a center axis perpendicular to the axis of cylindrical workpiece at a distance S1 from its one end.

To proceed with the drilling process, first clamp the workpiece 3 on a work table, not shown, equipped with devices for longitudinal (X axis) and traversal (Y axis) feeding, with suitable clamping means such as a vise 4 as shown in FIG. 4, leaving the ends of the workpiece free. Then align the axis of the workpiece parallel to the X axis of the work table, and fix it securely.

Then turn on switch 72 and push down probe member 20 to cause its lower end 23 to come into contact with upper end 62 of needle 60. Lamp 76 should be lit accordingly. Mount centering pointer 1 onto the spindle of the drill press with lower end 61 of needle 60 pointing downwards while probe member lower end 23 remains in contact with upper end 62 of needle 60 and lamp 76 remains on.

Then manipulate the feeding devices to move the workpiece towards the lower end of centering pointer 1, until the upper side portion of workpiece 3 comes into contact with the lower end of centering pointer 1, along the convex path of the surface of the workpiece. The work table must be so manipulated as to ensure that lower end of needle 60 slides along direction T or toward the peak of the convex path of the surface of the workpiece, so as to cause needle 60 to ascend. The ascending movement of needle 60 causes probe member 20 to ascend accordingly while upper end of needle 60 remains in contact with lower end 23 of probe member 20 and lamp 74 remains on (FIG. 1). As soon as lower end 61 of needle 60 slides over the peak of the convex path of the surface of the workpiece, needle 60 starts to descend, with probe member 20 being stopped and remaining at the position where lower end 61 was at the peak of the convex path, or the upper dead center, thus causing upper end 62 of needle 60 to separate from lower end 23 of probe member 20 and lamp 76 to be turned off. The psoition of the work table when lamp 76 is turned off is then noted with a first mark.

To assure the accuracy of the alignment procedure, move the work table gently in the reversed direction to cause point 61 of needle 60 to slide backwards along the same path. Needle 60 is then caused to ascend until its lower end 62 arrives at the peak where upper end 62 of needle 60 again comes into contact with lower end 23 of probe member 20 which remains at the upper dead center, and as a result lamp 76 is again turned on. Note the position of the work table when lamp 76 is turned on with a second mark, which should coincide with the first mark.

If the second mark does not coincide with the first mark, an intermediate point between the two marks may be identified to represent the peak point.

At the marked point or the identified peak point, the work table is in the position where the center axis C-C of the workpiece is aligned with the center axis of the spindle of the drill press. Then lock the feeding device along the Y axis to prevent the movement of the work table along the Y axis.

The center of the hole to be drilled is yet to be located by locating distance S1 from one end of workpiece 3, as follows.

First lower the worktable to clear workpiece 3 from needle 60. Securely attach a precision angle plate 5 to the work talbe with its vertical surface 51 in abutment with the end surface 31 of workpiece 3, to which end surface 31 distance S1 is referred. Mount the centering block 2 onto the upper, inner edge of angle plate 5 with surface 204 abutting the vertical surface 51 of angle plate 5, as shown in FIG. 5. Since there is a magnet embedded in surface 204 of centering block 2, centering block 2 will steadily stick to angle plate 5 which is normally made of iron. Then move the work table along the X axis and raise the work table until the upper surface of centering block 2 comes into contact with the lower end of needle 60 of centering pointer 1. Repeat the same process as described above with reference to FIG. 4, so as to align the vertical center axis passing through peak K of the arcuate surface of centering block 2 with the center axis of centering pointer 1, or the center axis of the spindle of the drill press. Since surface 204 abutting the end surface of the workpiece 3 passes through the vertical center axis of the centering block 2, and the vertical center axis of the centering block is now aligned with the center axis with the spindle of the drill press, the end surface of workpiece 3 is now aligned with the center axis of the spindle.

Then take the reading on the scale of the feeding device and mark the position of the work table along the X axis. Move the work talbe a distance of S1 from the marked position along the X axis; the center position of the hole to be drilled is thus located and aligned with the center axis of the spindle. Lock the feeding device to prevent the movement of the work table along the X axis, dismantle the centering pointer 1 from the spindle and mount the drill of specified size. The drilling operation can now proceed.

FIGS. 6 and 7 show a second example, wherein a rectangular workpiece 6 is to be prepared for a hole to be drilled with its center axis E at a distance S2 from the longitudinal center line X-X and S3 from transverse center line Y-Y of workpiece 6. In this example the procedure is similar to that in the preceeding example except that the mid point position of length L of workpiece 6 is to be located first.

To locate the center position, first locate the position C1, C2 of the side edges along the X axis by mounting a centering block onto the upper edge of each side edge as shown in FIG. 7, and aligning the vertical center axis of each centering block with the centering pointer mounted onto the spindle of the drill press. Mark the located positions C1, C2 on the scale of the feeding device of the work table, and identify the mid-position between the two marked positions so as to locate center position Z-Z. Then by moving the work table a distance of S3 from the located center position Z, the center position of the hole along the X axis is located.

The center position of the hole along the Y axis can be located and aligned with the center axis of the spindle in the same manner described above.

I claim:

1. A centering device comprising:
  (a) a centering pointer having:
    a cylindrical, hollow metallic holder having a longitudinal center axis and two ends and being adapted to be coaxially detachably mounted onto the spindle of a manufacturing machine;
    a metallic needle member slidably held within said holder and having a pointed lower end extending out of one end of said holder and an upper end disposed within said holder, and a stopper adapted to limit the axial movement of said needle member with respect to said holder, said needle member being in sliding contact with an inner wall of said holder;
    a spring means to urge said needle member towards the said lower end of said holder;
    a probe member coaxially slidably held within said holder to correspond with the upper end of said needle member, said probe member being electrically conductive and electrically insulated from said holder;
    a resilient, metallic contact member adapted to fricitonally restrict the movement of said probe member; an elastic cap for covering the upper end of said holder,
    a visual indicator means comprising an indicator lamp, a dry battery a switch and an electric cord connecting said switch and said resilient contact member so arranged that with said switch turned on said indicator lamp is caused to be lit when the upper end of said needle member comes into contact with said probe member; and
  (b) a truncated cylindrical centering block provided with a cylindrical surface having a center axis, and an L-shaped cutaway having two planar surfaces forming a 90 degree angle therebetween, at least one of said surface passing through said center axis; said centering block adapted to be mounted on an article having a vertical planar surface with one surface abutting said vertical planar surface of said article to be aligned with the center axis of said centering pointer, said alignment being attained by causing said needle member of said centering pointer to move axially by moving said centering block with said article in a direction perpendicular to the center axis of said centering pointer so that said lower end of said needle member contacts and moves along said cylindrical surface with upward movement of said needle member causing said probe member to move to and remain at a position where said needle member comes into contact therewith and moves apart therefrom to activate said visual indicator means which thereby indicates that the center axis of said centering pointer has been aligned with the center axis of said centering block.

* * * * *